(12) United States Patent
Junkins et al.

(10) Patent No.: US 6,198,486 B1
(45) Date of Patent: Mar. 6, 2001

(54) METHOD OF USING A HYBRID ERROR METRIC FOR MULTI-RESOLUTION MESH GENERATION

(75) Inventors: Stephen Junkins; Mike B. MacPherson, both of Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/159,312

(22) Filed: Sep. 23, 1998

(51) Int. Cl.[7] .......................... G06T 15/00; G06T 17/00; G06T 11/00
(52) U.S. Cl. ...................... 345/419; 345/428; 345/433
(58) Field of Search ................................ 345/419, 420, 345/428–429, 433, 439, 441

(56) References Cited

U.S. PATENT DOCUMENTS

| | | | |
|---|---|---|---|
| 5,929,860 | * | 7/1999 | Hoppe ................................. 345/419 |
| 5,963,209 | * | 10/1999 | Hoppe ................................. 345/419 |
| 5,966,133 | * | 4/2000 | Hoppe ................................. 345/420 |
| 6,046,744 | * | 4/2000 | Hoppe ................................. 345/419 |
| 6,108,006 | * | 8/2000 | Hoppe ................................. 345/420 |

OTHER PUBLICATIONS

Garland, Michael, et al., "Simplifying Surfaces with Color and Texture using Quadric Error Metrics," Proceedings Visualization 1998, 8 pages.
Garland, Michael, et al., "Surface Simplification Using Quadric Error Metrics" SIGGRAPH 97 Proceedings, Aug. 1997, pp. 209–216.

* cited by examiner

Primary Examiner—Mark R. Powell
Assistant Examiner—Chanté E. Harrison
(74) Attorney, Agent, or Firm—Steven P. Skabrat

(57) ABSTRACT

Generating a multi-resolution mesh from an original mesh representing a scene or object is achieved by collapsing edges of the original mesh in a first order defined by a surface area error metric to produce a modified mesh, and collapsing edges of the modified mesh in a second order defined by a combination quadric and surface area error metric to produce a multi-resolution mesh. The transition from using the surface area error metric to the combination of the surface area error metric and the quadric error metric occurs when a cost for removing one of the edges from the mesh as determined by the surface area error metric exceeds a threshold. A volume error metric may be used in conjunction with the surface area error metric in collapsing edges of the mesh to allow an edge collapse only when the volume error metric for the edge indicates collapsing the edge will not substantially alter the shape of the mesh.

25 Claims, 3 Drawing Sheets

METHOD OF USING A HYBRID ERROR METRIC FOR MULTI-RESOLUTION MESH GENERATION

BACKGROUND

1. Field

The present invention relates generally to graphics for display systems and, more specifically, to multi-resolution modeling of scenes or objects in display systems.

2. Description

In computer graphics, a model is a structured digital representation of an object or scene. Many computer graphics applications employ complex, detailed models of scenes or objects to maintain a convincing level of realism for a user. Consequently, models are often created or acquired at a resolution to accommodate this desire for detail. However, depending on the application, this complexity of such models may be excessive, and since the computational cost of using a model is typically related to its complexity, it is often useful to have simpler versions of complex models. Hence, methods of automatically and efficiently producing simplified models are desirable.

A goal of multi-resolution modeling is to extract the details from complex models that are desirable for rendering a scene and to remove other, excessive details. A multi-resolution model is a model which captures a wide range of levels of detail of an object and which can be used to reconstruct any one of those levels. Such models are typically represented as a mesh of many triangles, each triangle having three vertices and three edges. A mesh may be represented by a data structure stored in a data storage device. One area of research in multi-resolution modeling has been the development of iterative edge contraction techniques. An edge contraction (also known as an edge collapse) takes the two endpoints (vertices) of a target edge within a mesh, moves them to the single position, links all incident edges to one of the vertices of the mesh, deletes the other vertex, and removes any faces that have degenerated into lines or points. Typically, this removes two triangular faces per edge contraction, thereby simplifying the model. Edge contraction processes work by iteratively contracting edges of the mesh until a desired resolution is achieved. Differences in such processes lie primarily in how a particular edge to be contracted is chosen.

Surface simplification is a restricted form of edge contraction in multi-resolution modeling. In polygonal surface simplification, a goal is to take a polygonal model as input data and generate a simplified model (e.g., an approximation of the original) as output data. The focus of such simplification is on polygonal models represented as meshes comprising only triangles (e.g., wire frame models). This implies no loss of generality, because every polygon in an original model can be triangulated as part of a pre-processing phase.

Simplification is useful in order to make storage, transmission, computation, and display of models more efficient. A compact approximation of a model can reduce disk and memory utilization and can speed network transmission. It can also accelerate a number of computations involving shape information, such as finite element analysis, collision detection, visibility testing, shape recognition, and display. Reducing the number of polygons in a model can make the difference between slow display and real time display.

A surface simplification process is described by Michael Garland and Paul S. Heckbert in "Surface Simplification Using Quadric Error Metrics", SIGGRAPH 97 Proceedings, pages 209–216, August, 1997, although the invention is not limited in scope in this respect. Garland and Heckbert describe a process for producing simplified versions of polygonal models that is based on the iterative contraction of vertex pairs (which is a generalization of edge contraction). In this process, a geometric error approximation is maintained at each vertex of the current model. The error approximation is used as the determining factor in identifying the order for iterative edge contractions. According to Garland and Heckbert, the error approximation is represented using quadric matrices. The quadrics stored with the final vertices can also be used to characterize the overall shape of the model's surfaces. In this process, ten floating point numbers are used for storing the error approximation at each vertex.

This process was extended by Michael Garland and Paul S. Heckbert in "Simplifying Surfaces With Color And Texture Using Quadric Error Metrics", Proceedings Visualization 1998, to models having material properties such as colors, textures, and surface normals, although, again, the invention is not limited in scope in this respect. The quadric error metric was modified to account for a range of vertex attributes. However, the generalized error metric incurred additional space and processing overhead when implemented on a computer system because the size of the quadric matrix grows quadratically in the size of the attributes. For example, the number of unique coefficients according to this method for each vertex of the model becomes 21 with a model having a geometry and two-dimensional texture, 28 with a model having a geometry and color, and 28 with a model having a geometry and surface normals.

In addition, the methods disclosed by Garland and Heckbert often make mistakes in simplifying a model, particularly when dealing with objects having long, skinny features such as claws and tails, for example. Their methods tend to remove or shorten these features of the model prematurely.

Therefore, an improved iterative edge contraction process for simplifying multi-resolution models is desired which reduces storage and processing utilization and produces more accurate simplifications.

SUMMARY

An embodiment of the present invention is a method of generating a first mesh from a second mesh representing a scene or object. This embodiment includes collapsing edges of the second mesh in a first order defined by a surface area error metric to produce a third mesh, and collapsing edges of the third mesh in a second order defined by a combination quadric and surface area error metric to produce the first mesh.

BRIEF DESCRIPTION OF THE DRAWINGS

The features and advantages of the present invention will become apparent from the following detailed description of the present invention in which.

DETAILED DESCRIPTION

An embodiment of the present invention is a method of generating simplified versions of models represented as meshes. In particular, an embodiment comprises an improvement in the error metric component of existing mesh generation processes. Embodiments of the present invention use a surface area error metric and optionally a volume error metric in conjunction with a well-known quadric error metric to efficiently determine which vertices are lesser important vertices to the shape of a mesh. As used herein, a metric is a process for determining vertices of a mesh, that, when removed from a mesh, cause a reduced amount of damage visually to the shape of the model in comparison with other vertices. The edges affected by these vertices are iteratively removed one at a time from the mesh to produce a series of models from the original, greater complexity mesh to a lesser complexity mesh. Since the iterative edge contraction process generates a series of models, a user may adjust the resolution of any generated mesh. The meshes may be stored for future use at any point in the iterative edge contraction process, thereby making available models with different levels of detail.

A model may be obtained from a variety of sources such as digital image scanners, authoring tools, digital cameras, and so on. The model may then be processed into a wire frame mesh format. Some meshes may contain thousands or even millions of triangles, although the invention is not limited in this respect. When the meshes are large, it becomes more desirable to use a simplification technique that is efficient in terms of storage and processing utilization. The mesh may be represented in a data structure comprising an array of vertices, an array of edges, and an array of faces. These arrays define the model's features such as its connectivity, shape, and possibly colors and textures. In this embodiment, each vertex may be represented as a set of x, y, and z coordinates in a three dimensional coordinate system. In this embodiment, each edge may be represented as pointers or links to two vertices. In this embodiment, each face may be represented as pointers or links to three vertices. In some models, color, texture, and surface normal information for faces may also be included. The model's data structure may be input to a simplification process to produce a data structure representing a simplified multi-resolution mesh which corresponds to an original, complex mesh.

Figure 1:
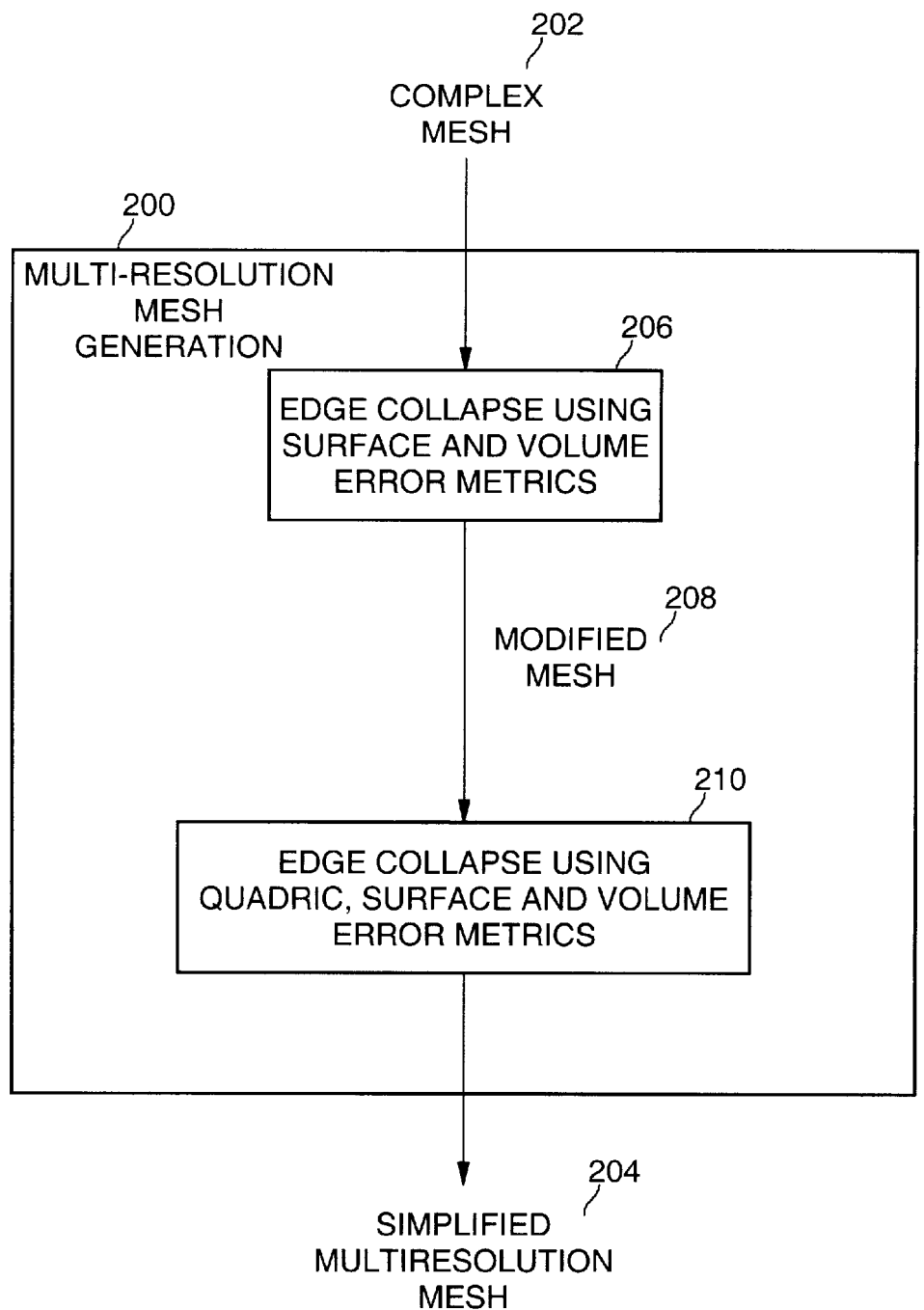
FIG. 1 is a diagram of a multi-resolution mesh generation process according to an embodiment of the present invention.

FIG. 1 is a diagram of a multi-resolution mesh generation process according to an embodiment of the present invention. Multi-resolution mesh generation process 200 accepts a complex mesh 202 data structure as input data and produces a simplified multi-resolution mesh 204 data structure as output data. Edge collapse using surface and volume error metrics 206 accepts the complex mesh, reduces it using edge collapse techniques based on edges identified by surface area and volume error metrics, and produces modified mesh 208. Block 206 eliminates a large percentage of the edges in the complex mesh 202 in a manner which reduces storage and processing utilization. Edge collapse using quadric, surface, and volume error metrics 210 accepts the modified mesh, reduces it using edge collapse techniques based on edges identified by quadric, surface area, and volume error metrics, and produces simplified multi-resolution mesh 204.

In this embodiment, in both edge collapse using surface and volume error metrics 206 and edge collapse using quadric, surface and volume error metrics 210, the same well-known edge collapse process is used, however, different error metrics are employed and, thus, the ordering of edges may be different. Block 210 operates only on the edges remaining in modified mesh 208. In some example complex meshes operated on by one embodiment of the present invention, up to approximately 80% of the edges may be eliminated by edge collapse using surface and volume error metrics 206 and up to approximately 20% of the edges may be eliminated by edge collapse using quadric, surface, and volume error metrics 210. Of course, the actual percentage of edges eliminated at each block may depend on the features and complexity of the complex mesh being processed. Since edge collapse using surface and volume error metrics 206 is computationally efficient in processing the complex mesh, and only a portion of the original complex mesh is passed to edge collapse using quadric, surface and volume error metrics 210, the overall efficiency of multi-resolution mesh generation process 200 may be improved as compared to the efficiency of employing an edge collapse technique using a quadric error metric alone.

Figure 2:
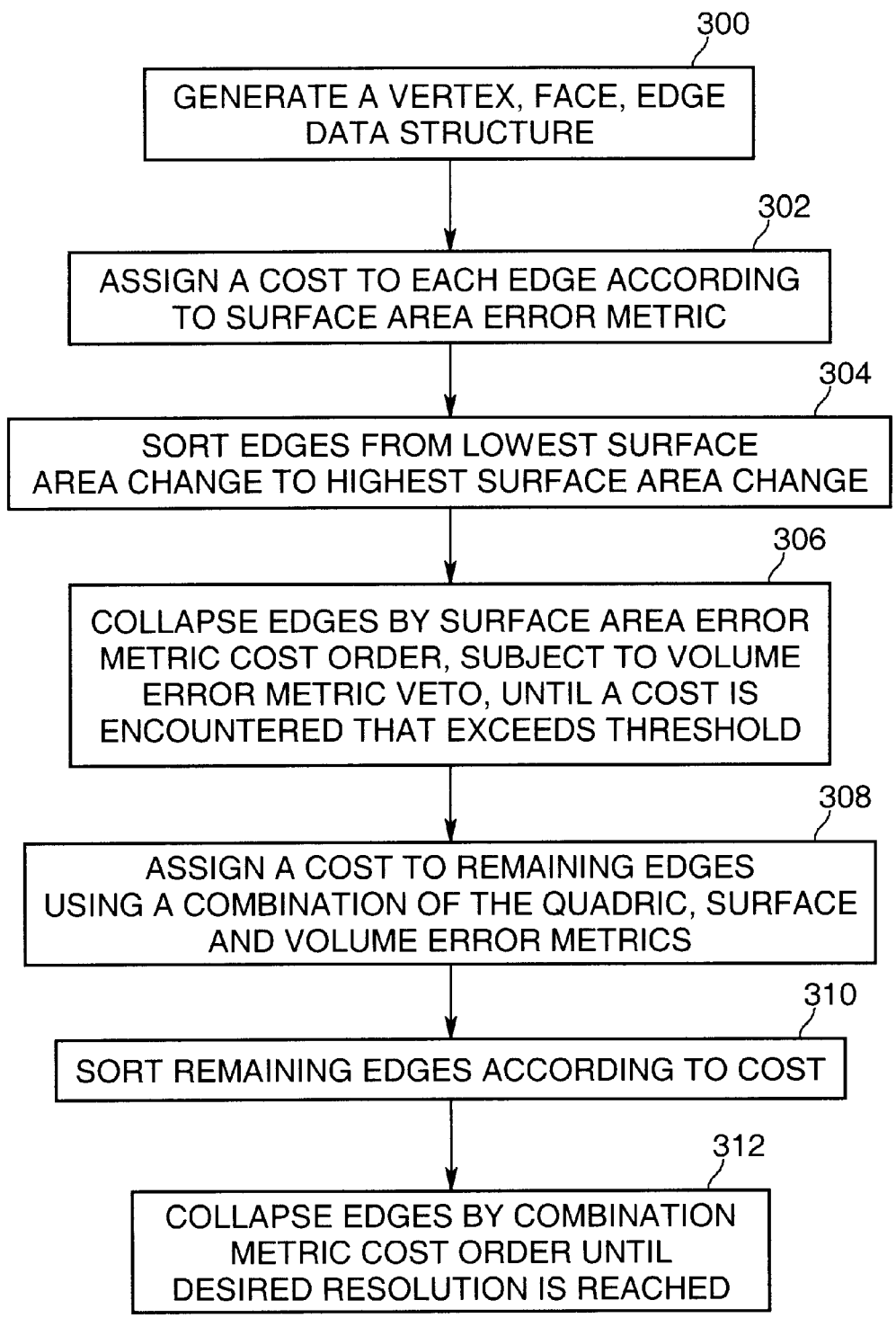
FIG. 2 is a flow diagram of a multi-resolution mesh generation process according to an embodiment of the present invention.

FIG. 2 is a flow diagram of a multi-resolution mesh generation process according to an embodiment of the present invention. Initially, at block 300 a data structure is generated for complex mesh 202 to represent the relationships between the vertices, edges, and faces of the mesh in a format which may be more efficient for error metric processing than the format of complex mesh 202. This data structure comprises mesh relationship information, such as which edges belong to vertices, which vertices are the end points of edges, and which vertices defines faces, for example. The data structure may also comprise information relating to color, texture, and surface normals for faces. The data structure may be quicker to traverse when collapsing edges, yet it includes all of the original information of the complex mesh 202, thereby reducing overall processing time for surface simplification. Additionally, the surface area of all faces may be summed to form a total surface area for the complex mesh for use in determining a threshold percentage discussed below.

At block 302, a cost may be assigned to each edge of the mesh according to a surface area error metric. That is, each edge of the mesh may be examined to determine the damage to the shape of the mesh when that edge is collapsed, taking into account the surface area of all faces affected by this edge collapse. In one embodiment, the cost determined by the surface area error metric may be the difference between the sum of the face areas adjacent to an edge's vertices and the sum of the face areas adjacent to the remaining vertices after edge contraction. In an alternate embodiment, the surface error metric may be the square of the difference between the sum of the face areas adjacent to an edge's vertices and the sum of the face areas adjacent to the remaining vertices after edge contraction. In either embodiment, the cost is efficiently computed and employs only one floating point storage location in memory to store the cost for the edge. In other embodiments, the color, texture, or surface normal of a face may also be used to affect the surface area error metric by weighting the cost according such features.

At block 304, the edges of the complex mesh may be sorted based on the cost assigned to them in block 302. The edges may be sorted from lowest surface area change of the model to highest surface area change of the model. This ordering corresponds to a ranking from the lowest surface area change to the highest surface area change. In alternate embodiments, different sorting criteria may be employed. After block 304, an ordered list of edges is available to use for edge collapse operations based on the results of the surface area error metric. At block 306, the edges in the list may be collapsed according to the surface area error metric cost order using a well-known edge contraction process or a later developed edge contraction process until a cost is encountered that exceeds a pre-defined threshold amount.

Each edge collapse means the mesh is defined by one less edge. In one embodiment, the threshold may be a 1% change in local surface area. The 1% threshold has been empirically determined to work well for a large class of three dimensional models. However, other threshold values may be applicable, depending on the model being reduced.

In one embodiment, each collapse may be subject to a veto by a volume error metric. That is, if the volume error metric detects a defect in the proposed model, then the edge may not be collapsed. A volume error metric may be employed because occasionally an edge collapse may substantially preserve the surface area of the model despite the shape of the model being radically altered. This is undesirable because then the model's appearance may not accurate. The volume error metric may be used to detect these cases where edge collapses yield large changes in volume. Such edges may then be given a new cost according to the volume error metric based at least in part on the volume change. In one embodiment, edges identified by the volume error metric as causing a volume problem for the model may be appended to the end of the surface area error metric cost list, thereby delaying their collapse.

The volume error metric works on the intuition that large changes in volume (either positive or negative) are detrimental to the perceived shape of a model. In one embodiment, the volume error metric may be determined as follows. Given two vertices $v_k$ and $v_r$ which form an edge that is a candidate for collapse, measure the volume of tetrahedrons incident on those two vertices. Each tetrahedron may be formed between the three vertices belonging to a face incident on $v_k$ and with $v_r$. Sum the volumes of each such tetrahedron. Call this volume sum V. If the edge is collapsed and $v_r$ is "moved" to position $v_k$, alter the local volume of the model by V. If the total volume of the model has changed greater than a predetermined threshold, then the edge is not collapsed at this time and the edge may be added to the end of the surface area error metric cost list. Note that this volume computation is only valid for the edge collapse from $v_r$ to $v_k$. There is a corresponding volume for the edge collapse from $v_k$ to $v_r$.

At block 308, a cost may be assigned to all edges remaining in the modified mesh 208 using a combination of the quadric, surface and volume error metrics.

In an embodiment of the present invention, the cost for removing an edge may be computed as the cost according to the surface area error metric as discussed above multiplied by a constant value multiplied by the cost of removing the edge according to the quadric error metric as described by Michael Garland and Paul S. Heckbert in "Surface Simplification Using Quadric Error Metrics", SIGGRAPH 97 Proceedings, pages 209–216, August, 1997, although other quadric error metrics may also be employed and the invention is not limited in this respect. More specifically, in this embodiment the cost may be: (quadric cost+1.0)*((surface area cost*scale factor)+1.0). The scale factor may be empirically determined. In one embodiment, the scale factor may be 1.0. In one embodiment of the present invention, increasing the scale factor results in preserving color boundaries over preserving the shape of the model during edge collapses, while decreasing the scale factor results in preserving the shape of the model over preserving color boundaries. Of course, variations of this cost equation may be used as will be apparent to those skilled in the art. Note that constant 1.0 value is used to prevent the cost from going to zero when one of the quadric or surface area costs is zero. In another embodiment, the combination of the surface and quadric error metrics for determining the cost of removing an edge may be combined with a volume error metric.

At block 310, the remaining edges may be sorted according to the newly assigned costs, from a lowest cost to a highest cost, based on the potential damage to the shape of the mesh. At block 312, the edges may be iteratively collapsed in the combination metric cost order until a desired resolution of the model is reached. In one embodiment, all edges may be collapsed. At any point in the iterative edge collapse process, the multi-resolution mesh may be saved for later use, thereby obtaining meshes with differing levels of detail.

Embodiments of the present invention may reduce large complex meshes several orders of magnitude faster than the existing quadric error metric approach. For example, using prior art techniques, reduction of large complex meshes may take on the order of days of processing time, whereas with an embodiment of the present invention reduction of large complex meshes may take on the order of minutes of processing time. This makes authoring of multi-resolution, three dimensional graphical content more productive. The multi-resolution meshes generated by embodiments of the present invention are also more accurate than those generated with the quadric error metric, resulting in visibly improved images for the user.

Embodiments of the present invention employ less processing time than the quadric error metric approach when operating on the same mesh at least in part because they use less memory, which may allow the surface simplification process to be executed from random-access memory (RAM) of a system instead of from disk-based virtual memory. Since processes for multi-resolution mesh generation inherently have little temporal or spatial locality, a virtual memory system may be forced to frequently access disk storage within the system whenever the complex mesh data structure exceeds the size of the RAM. Thus, it is desirable to reduce the storage requirements of a multi-resolution mesh generation method. The well-known quadric error metric employs at least ten floating point numbers per vertex to represent the metric. With an embodiment of the present invention, one floating point number per vertex may be employed. Because in this embodiment only surface and volume metrics are used initially, the memory requirements to process the complex mesh may be greatly reduced. In embodiments of the present invention, the creation of quadric error matrics may be delayed until the surface and volume metrics may be deemed inadequate (based on a threshold, for example) for further accurate reduction of the model. Furthermore, embodiments of the present invention may be more accurate than the quadric error metric approach because in some embodiments undesirable artifacts associated with long skinny features within a model may be reduced, and a more visually appealing mesh may be produced, especially at lower resolutions.

Embodiments of the present invention enable graphical content developers to use a single high resolution three dimensional model and at run-time extract the level of detail appropriate for the capabilities of the processor of the system being used. Application programs having such models may be more visually appealing to a user when executed on more powerful processors. The multi-resolution meshes generated by embodiments of the present invention may be used to transmit three dimensional images over networks, such as the Internet, for example. In these cases, the lowest resolution model may be sent over the network first, followed by incremental updates which increase the resolution. The result is that the three dimensional model being viewed in a browser program may gradually become more detailed as the download progresses.

Embodiments of the present invention may also have applications beyond the reduction of three dimensional graphical models. Many types of data, including images, video, audio, and animation, may be represented as surfaces. Because surface simplification effectively compresses the original data by removing lesser important data, embodiments of the present invention may be applicable to the compression of these multimedia data types.

In the preceding description, various aspects of the present invention have been described. For purposes of explanation, specific numbers, systems and configurations were set forth in order to provide a thorough understanding of the present invention. However, it is apparent to one skilled in the art that the present invention may be practiced without the specific details. In other instances, well known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 3:
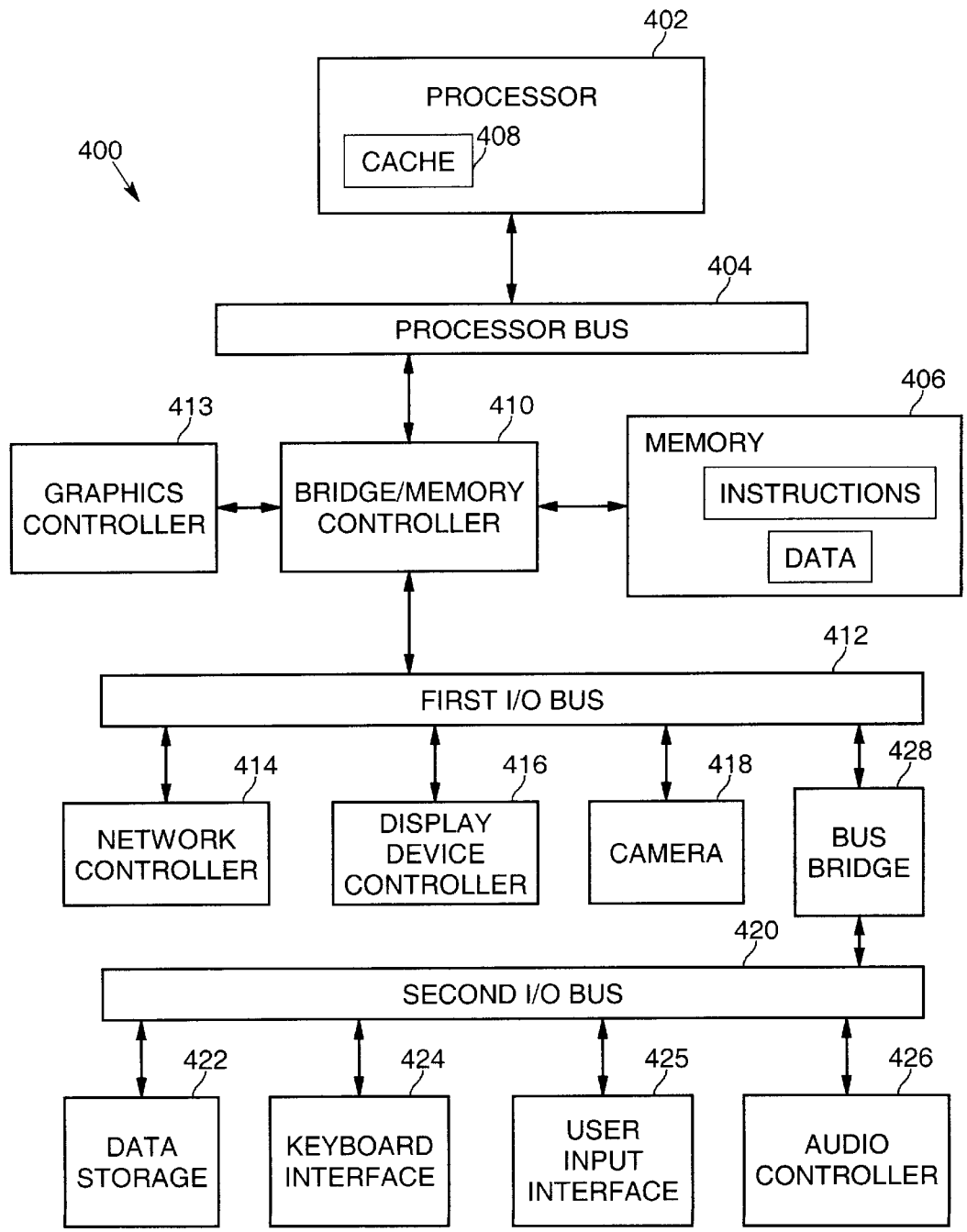
FIG. 3 is a diagram illustrating a sample system suitable to be programmed according to an embodiment of a method for generating a multi-resolution mesh.

An example of one such type of processing system is shown in FIG. 3. Sample system 400 may be used, for example, to execute the processing for methods in accordance with the present invention, such as the embodiment described herein. Sample system 400 is representative of processing systems based on the PENTIUM®, PENTIUM® Pro, and PENTIUM® II microprocessors available from Intel Corporation, although other systems (including personal computers (PCs) having other microprocessors, engineering workstations, set-top boxes and the like) may also be used. In one embodiment, sample system 400 may be executing a version of the WINDOWS™ operating system available from Microsoft Corporation, although other operating systems and graphical user interfaces, for example, may also be used.

FIG. 3 is a block diagram of a system 400 of one embodiment of the present invention. The computer system 400 includes a processor 402 that processes data signals. The processor 402 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 3 shows an example of an embodiment of the present invention implemented as a single processor system 400. However, it is understood that embodiments of the present invention may alternatively be implemented as systems having multiple processors. Processor 402 may be coupled to a processor bus 404 that transmits data signals between processor 402 and other components in the system 400.

System 400 includes a memory 406. Memory 406 may be a dynamic random access memory (DRAM) device, a static random access memory (SRAM) device, or other memory device. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406. Cache memory 408 in this embodiment speeds up memory accesses by the processor by taking advantage of its locality of access. Alternatively, in another embodiment, the cache memory may reside external to the processor.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In some embodiments, the bridge/memory controller provides a graphics port for coupling to a graphics controller 413. In this embodiment, graphics controller 413 interfaces to a display device (not shown) for displaying images rendered or otherwise processed by the graphics controller 413 to a user. The display device may comprise a television set, a computer monitor, a flat panel display, or other suitable display device.

First I/O bus 412 may comprise a single bus or a combination of multiple buses. First I/O bus 412 provides communication links between components in system 400. A network controller 414 may be coupled to the first I/O bus 412. The network controller links system 400 to a network that may include a plurality of processing systems (not shown in FIG. 3) and supports communication among various systems. The network of processing systems may comprise a local area network (LAN), a wide area network (WAN), the Internet, or other network. In some embodiments, a display device controller 416 may be coupled to the first I/O bus 412. The display device controller 416 allows coupling of a display device to system 400 and acts as an interface between a display device (not shown) and the system. The display device may comprise a television set, a computer monitor, a flat panel display, or other suitable display device. The display device receives data signals from processor 402 through display device controller 416 and displays information contained in the data signals to a user of system 400.

In some embodiments, camera 418 may be coupled to the first I/O bus. Camera 418 may comprise a digital video camera having internal digital video capture hardware that translates a captured image into digital graphical data. The camera may comprise an analog video camera having digital video capture hardware external to the video camera for digitizing a captured image. Alternatively, camera 418 may comprise a digital still camera or an analog still camera coupled to image capture hardware. A second I/O bus 420 may comprise a single bus or a combination of multiple buses. The second I/O bus 420 provides communication links between components in system 400. A data storage device 422 may be coupled to the second I/O bus 420. The data storage device 422 may comprise a hard disk drive, a floppy disk drive, a CD-ROM device, a flash memory device, or other mass storage device. Data storage device 422 may comprise one or a plurality of the described data storage devices.

A keyboard interface 424 may be coupled to the second I/O bus 420. Keyboard interface 424 may comprise a keyboard controller or other keyboard interface device. Keyboard interface 424 may comprise a dedicated device or may reside in another device such as a bus controller or other controller device. Keyboard interface 424 allows coupling of a keyboard to system 400 and transmits data signals from a keyboard to system 400. A user input interface 425 may be coupled to the second I/O bus 420. The user input interface may be coupled to a user input device, such as a mouse, joystick, or trackball, for example, to provide input data to the computer system. Audio controller 426 may be coupled to the second I/O bus 420. Audio controller 426 operates to coordinate the recording and playback of audio signals. A bus bridge 428 couples first I/O bridge 412 to second I/O bridge 420. The bus bridge operates to buffer and bridge data signals between the first I/O bus 412 and the second I/O bus 420.

Embodiments of the present invention are related to the use of the system 400 to simplify multi-resolution models. According to one embodiment, simplifying a multi-resolution model using a hybrid error metric may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to simplify a multi-resolution model using a hybrid error metric according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions well-known in the art. In particular, data storage device 422 may be used to provide long-term storage for the executable instructions and data structures for embodiments of methods of simplifying multi-resolution models in accordance with the present invention, whereas memory 406 is used to store on a shorter term basis the executable instructions of embodiments of the methods for simplifying multi-resolution models in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of generating a first mesh from a second mesh comprising:
    collapsing edges of the second mesh in a first order defined by a surface area error metric to produce a third mesh; and
    collapsing edges of the third mesh in a second order defined by a combination quadric and surface area error metric to produce the first mesh.

2. The method of claim 1, wherein collapsing edges of the second mesh comprises:
    assigning a cost to each edge of the second mesh according to the surface area error metric;
    sorting edges of the second mesh into the first order from a lowest cost edge to a highest cost edge; and
    collapsing the edges in the first order.

3. The method of claim 2, wherein the cost represents a change in surface area of the second mesh due to collapse of the edge.

4. The method of claim 1, wherein the surface area error metric comprises a difference between a sum of face areas adjacent to an edge's vertices and a sum of face areas adjacent to remaining vertices after collapse of the edge.

5. The method of claim 1, wherein the surface area error metric comprises a square of a difference between a sum of face areas adjacent to an edge's vertices and a sum of face areas adjacent to remaining vertices after collapse of the edge.

6. The method of claim 1, wherein collapsing edges of the second mesh comprises collapsing edges of the second mesh until a cost for one of the edges exceeds a threshold.

7. The method of claim 1, wherein collapsing edges of the second mesh comprises collapsing edges of the second mesh only when a volume error metric for an edge indicates collapsing edges will not substantially alter the shape of the second mesh.

8. The method of claim 1, wherein collapsing edges of the third mesh comprises:
    assigning a cost to edges of the third mesh according to the combination quadric and surface area error metric;
    sorting edges of the third mesh into the second order from a lowest cost edge to a highest cost edge; and
    collapsing the edges in the second order.

9. The method of claim 8, wherein the combination quadric and surface area metric comprises a sum of a cost of removing an edge according to the surface area error metric multiplied by a constant value and a cost of removing the edge according to the quadric error metric.

10. The method of claim 1, wherein collapsing edges of the third mesh comprises collapsing edges of the third mesh until a desired resolution is reached for the first mesh.

11. The method of claim 1, wherein the combination quadric and surface area metric further comprises a volume error metric component.

12. An article comprising a machine readable medium having a plurality of machine readable instructions, wherein when the instructions are executed by a processor the instructions generate a first mesh from a second mesh by collapsing edges of the second mesh in a first order defined by a surface area error metric to produce a third mesh, and collapsing edges of the third mesh in a second order defined by a combination quadric and surface area error metric to produce the first mesh.

13. The article of claim 12, wherein instructions for collapsing edges of the second mesh further comprise instructions to assign a cost to each edge of the second mesh according to the surface area error metric, to sort edges of the second mesh into the first order from a lowest cost edge to a highest cost edge, and to collapse the edges in the first order.

14. The article of claim 12, wherein the cost represents a change in surface area of the second mesh due to collapse of the edge.

15. The article of claim 12, wherein the surface area error metric comprises a difference between a sum of face areas adjacent to an edge's vertices and a sum of face areas adjacent to remaining vertices after collapse of the edge.

16. The article of claim 12, wherein the surface area error metric comprises a square of a difference between a sum of face areas adjacent to an edge's vertices and a sum of face areas adjacent to remaining vertices after collapse of the edge.

17. The article of claim 12, wherein instructions to collapse edges of the second mesh comprises instructions to collapse edges of the second mesh until a cost for one of the edges exceeds a threshold.

18. The article of claim 12, wherein instructions to collapse edges of the second mesh comprise instructions to collapse edges of the mesh only when a volume error metric for an edge indicates collapsing edges will not substantially alter the shape of the second mesh.

19. The article of claim 12, wherein instructions to collapse edges of the third mesh comprise instructions to assign a cost to edges of the third mesh according to the combination quadric and surface area error metric, to sort edges of the third mesh into the second order from a lowest cost edge to a highest cost edge, and to collapse the edges in the second order.

20. The article of claim 19, wherein the combination quadric and surface area metric comprises a sum of a cost of removing an edge according to the surface area error metric multiplied by a constant value and a cost of removing the edge according to the quadric error metric.

21. A method for generating a multi-resolution mesh from an original mesh comprising:

collapsing at least one edge of the original mesh to generate a first modified mesh using a surface area error metric;

storing the first modified mesh as a first portion of the multi-resolution mesh;

collapsing at least one edge of the first modified mesh to generate a second modified mesh using a combination of the surface area error metric and a quadric error metric; and storing the second modified mesh as a second portion of the multi-resolution mesh.

22. The method of claim 21, wherein the surface area error metric comprises a difference between a sum of face areas adjacent to an edge's vertices and a sum of face areas adjacent to remaining vertices after collapse of the edge.

23. The method of claim 21, wherein collapsing at least one edge of the original mesh to generate the first modified mesh comprises collapsing at least one edge of the original mesh to generate the first modified mesh using the surface area error metric and a volume error metric.

24. The method of claim 21, wherein collapsing at least one edge of the first modified mesh to generate the second modified mesh comprises collapsing at least one edge of the first modified mesh to generate the second modified mesh using a combination of the surface area error metric, the quadric error metric and a volume error metric.

25. The method of claim 21, wherein collapsing at least one edge of the original mesh to generate the first modified mesh comprises collapsing at least one edge of the original mesh to generate the first modified mesh until a cost for collapsing one of the edges according to the surface area error metric exceeds a threshold.

* * * * *

UNITED STATES PATENT AND TRADEMARK OFFICE
CERTIFICATE OF CORRECTION

PATENT NO. : 6,198,486 B1
DATED : March 6, 2001
INVENTOR(S) : Junkins et al.

It is certified that error appears in the above-identified patent and that said Letters Patent is hereby corrected as shown below:

<u>Column 2,</u>
Line 17, delete "Matrics" and insert -- Metrics --.

Signed and Sealed this

Twenty-sixth Day of February, 2002

*Attest:*

*Attesting Officer*

JAMES E. ROGAN
*Director of the United States Patent and Trademark Office*